No. 675,100. Patented May 28, 1901.
J. McDOUGALL & J. PERRIE.
AIR BRAKE COUPLING.
(Application filed Nov. 17, 1900.)
(No Model.)

Witnesses
John Maupin.
L. S. Black.

Inventors
J. McDougall
Jno. Perrie,
per R. B. Chamberlin,
Attorney

UNITED STATES PATENT OFFICE.

JAMES McDOUGALL, OF BUFFALO, AND JOHN PERRIE, OF DEPEW, NEW YORK.

AIR-BRAKE COUPLING.

SPECIFICATION forming part of Letters Patent No. 675,100, dated May 28, 1901.

Application filed November 17, 1900. Serial No. 36,915. (No model.)

*To all whom it may concern:*

Be it known that we, JAMES MCDOUGALL, residing at Buffalo, and JOHN PERRIE, residing at Depew, in the county of Erie and State of New York, citizens of the United States, have invented certain new and useful Improvements in Couplings for Air-Brakes; and we do hereby declare the following to be a full, clear, and exact description of the invention, such as will enable others skilled in the art to which it appertains to make and use the same.

Our invention relates to an improvement in couplings for air-brakes; and its object is to produce a coupler which is perfectly dust and moisture proof and is intended as an improvement upon Patent No. 622,522, dated April 4, 1899, heretofore granted to us.

Our invention consists of a main valve combined with a smaller valve which is placed therein and through which smaller valve the air escapes when the pressure in the pipe reaches a certain regulated degree while the main valve is closed, as will be more fully described hereinafter.

Figure 1:
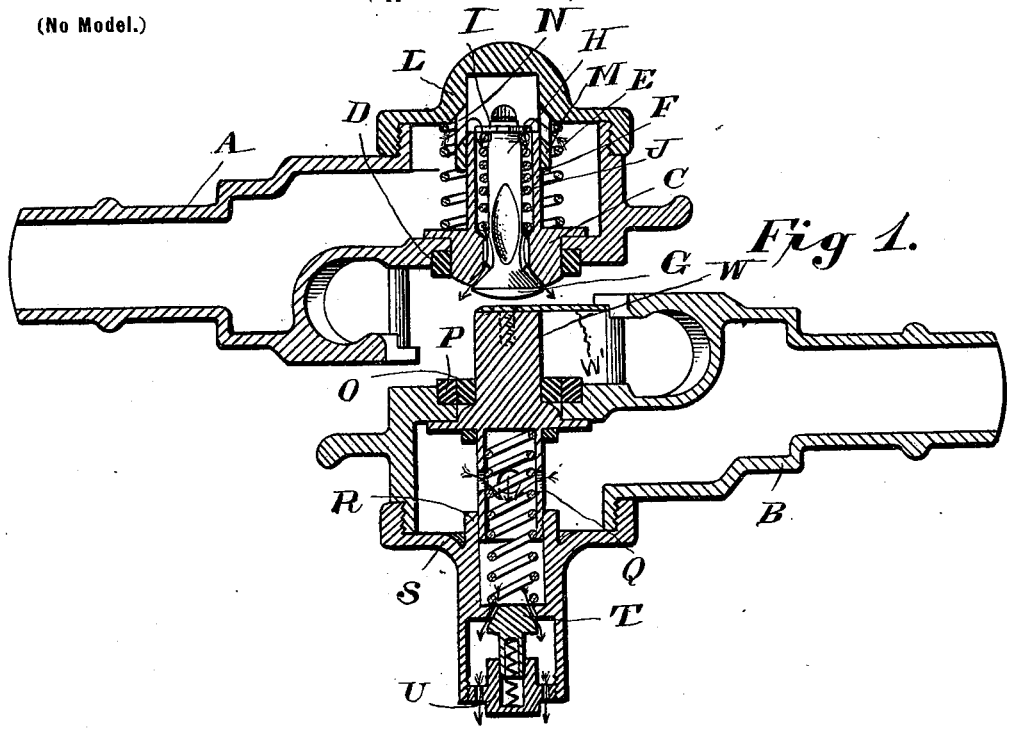
Figure 2:
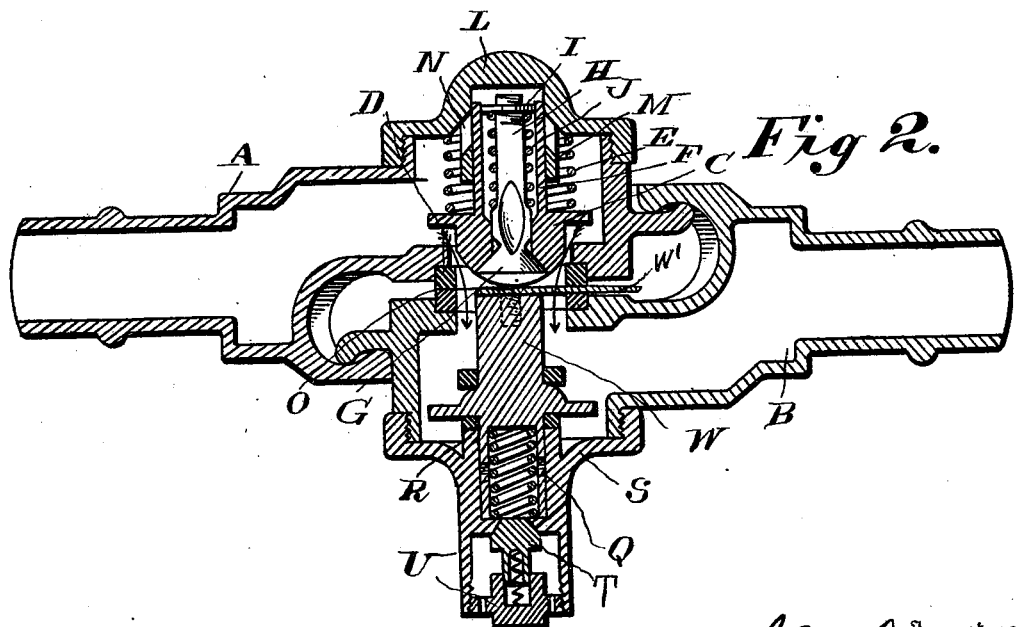

In the accompanying drawings, Figure 1 is a vertical section through the two parts of the coupling, which are disconnected, showing the normal positions of the operating parts. Fig. 2 is a similar view showing the two parts of the coupler connected.

A B represent the frames of the two parts of the coupler, which is the same or substantially the same as that now in common use. In the frame A is placed the spring-actuated valve C, which fits snugly upon the rubber seat D, prepared for it, so as to be perfectly air-tight. The spring E keeps the valve pressed upon its seat until the two parts of the coupling are brought together, when the valve is forced from its seat, so as to allow a free passage of air from one part of the coupling to the other. Extending inwardly into the frame from the inner side of this valve is a tube F, and through the center of the main valve C is formed an opening in which the valve G is placed. This valve is provided with a stem H and a guiding-plate I upon its extreme inner end, and which plate serves as a bearing for one end of the spring J and also to guide the valve G in its movements. This stem is grooved, so as to permit the air to pass freely around it, and the valve G remains seated until the pressure of air is admitted into the frame A, when the valve is raised a suitable distance above its seat by the pressure of the air against its under side. Projecting inwardly from the inner side of the screw-cover L is a tube M, which has perforations N made through its side and through which the air passes, so as to lift the valve G from its seat. This valve G moves in the opposite direction from the valve C, so that while the valve C is forced inwardly into the frame A when the two parts of the coupling are brought together the valve G is forced outwardly through the valve C. In the other part B of the frame is placed the large air-valve O, having a rubber collar or flange formed upon its face and which makes a tight joint with the rubber valve-seat P. Projecting inwardly into the casing from the inner side of this valve O is the perforated tube Q, and which tube has its inner end to fit in and be guided in its movements by the tubular part R of the screw-cap S. As long as the valve O remains seated the perforated portion of the tube Q does not enter the tubular part R upon the cover; but when the valve O is forced from its seat the perforated portion of the tube Q passes into the tubular portion of R, so as to close the openings in the tube Q, and thus prevent the passage of the air under pressure into the tubular part R of the cap S. In this tubular part R of the cap S is formed a diaphragm, and through this diaphragm is formed a valve-seat, against which the spring-actuated valve T is made to close. The lower end of the tubular portion R of the cap is closed by a perforated plug U, which is provided with a tubular portion into which the end of the stem of the valve T and its actuating-spring are made to catch. When the pressure in the coupling exceeds a certain pressure and the valve O is upon its seat, the pressure of the air opens the valve T and escapes through the perforated plug in the lower end of the tubular part R of the cap. When, however, the valve I is opened, as shown in Fig. 2, the perforated part of the tube Q is forced into the tubular part R of the cap, and thus the openings through the tube Q are closed and the pressure of the air is prevented from operating the valve T and escaping.

When the two parts of the coupling are brought together, the projecting part W of the valve O strikes against the valve C, and the two valves C O are forced from their seats to allow the free passage of air from one part of the coupling to the other, and at the same time the pressure of the air striking against the inner side of the valve G forces it outwardly from the valve C, so as to strike against the projection W, and thus force this valve O still farther open. In case the valve C is unseated when the two parts of the coupling are brought together, the valve G will be forced outwardly sufficiently far to strike against the projection W and force the valve O from its seat.

By placing the valve G in the valve C practically a double valve is formed, and the air can then pass through the valve C whether the valve C is unseated or not. By the construction here shown the escape is on the front valve directly opposite the old one, and thus dispenses with the long projection at the bottom shown in our former patent above referred to. We also do away with the arm and stud shown in our former patent and place the spring outside of the valve-tube instead of inside.

The cap for each part of the coupling is shown as screw-threaded and may either screw upon the outer side of the casing, which is correspondingly screw-threaded to receive them, or each part of the casing may be internally screw-threaded, and then the caps will be screwed inside instead of out.

To the outer end of the projection W is secured an arm W', which is very thin and becomes embedded in the rubber valve-seat P when the two members are connected. Should one of the parts of the coupling not be provided with the protruding valve G, the face of the opposite coupling will strike against the arm W' and force the valve open.

Having thus described our invention, we claim—

1. In a coupling for air-brakes, the air-valve C provided with a valve-seat, combined with a valve G placed in the valve C, and which is operated by the pressure of air so that it moves in the opposite direction from the one C.

2. In a coupler for air-brakes, the two parts of the casing A, B, and the spring-actuated valves C, O, placed therein, combined with a spring-actuated valve placed in the valve C, and which is forced outwardly through the valve C by the pressure of the air so as to operate the valve O, substantially as described.

In testimony whereof we affix our signatures in presence of witnesses.

JAMES $\overset{\text{his}}{\times}$ McDOUGALL.
mark

JOHN PERRIE.

Witnesses to signature of James McDougall:
ALICE M. SCOTT,
GEORGE GILLIE.

Witnesses to signature of John Perrie:
SAMUEL THOMSON,
CARL A. SANDSTROM.